H. HOLLAND.
TROLLEY WHEEL.
APPLICATION FILED NOV. 20, 1911.

1,040,680.

Patented Oct. 8, 1912.

ATTEST
E. M. Fisher
F. C. Mussun.

INVENTOR
Henry Holland
BY Fisher & Mott
ATTYS.

UNITED STATES PATENT OFFICE.

HENRY HOLLAND, OF CLEVELAND, OHIO.

TROLLEY-WHEEL.

1,040,680.     Specification of Letters Patent.     Patented Oct. 8, 1912.

Application filed November 20, 1911. Serial No. 661,257.

*To all whom it may concern:*

Be it known that I, HENRY HOLLAND, a citizen of the United States, residing at Cleveland, in the county of Cuyahoga and State of Ohio, have invented certain new and useful Improvements in Trolley-Wheels, of which the following is a specification.

This invention appertains to improvements in trolley wheels for use on electric cars, and the invention consists in a wheel having spring pressed contact rings at its sides and springs interlocked with the wheel, all substantially as shown and described and particularly pointed out in the claims.

Figure 1:
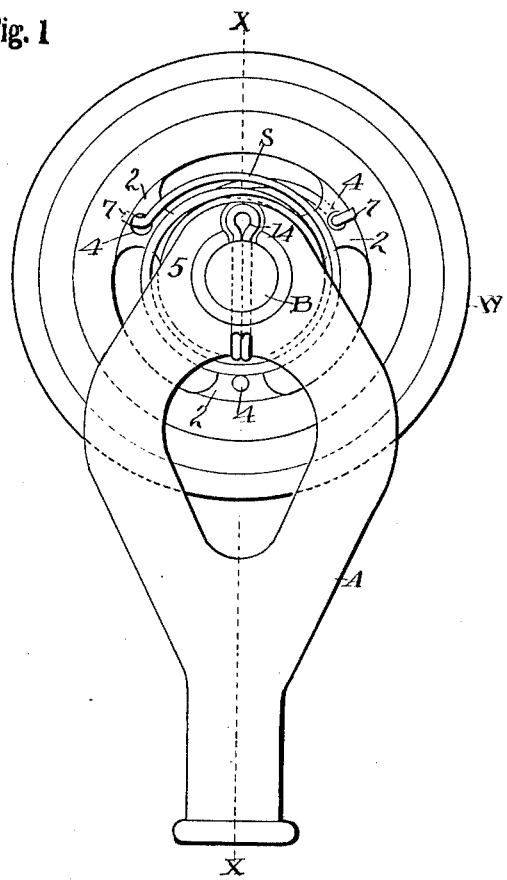
Figure 2:
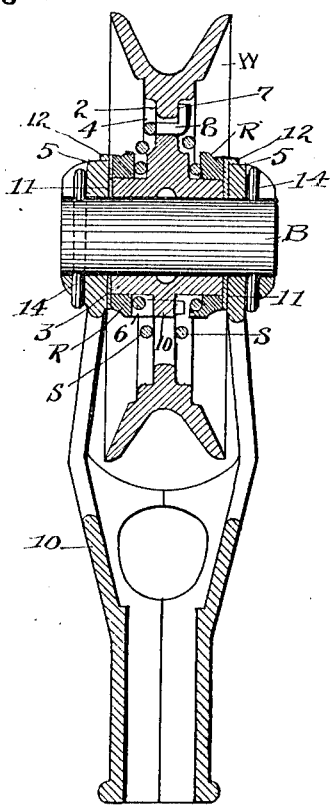
Figure 3:
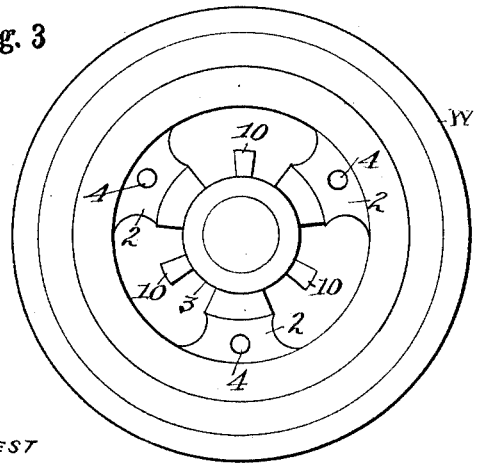
Figure 4:
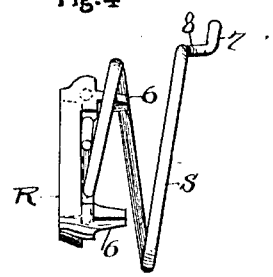

In the accompanying drawings, Figure 1 is a side elevation of a trolley wheel and the support therefor, and Fig. 2 is a sectional elevation on line *x—x*, Fig. 1. Fig. 3 is a side elevation of the wheel alone, and Fig. 4 is an edge elevation of one of the contact rings and a spring therewith.

A represents the immediate head or support for the trolley wheel, having a socket as usual for the trolley pole, not shown, and known to the trade as the "harp", owing to its shape. B is the usual spindle supported in the harp in the usual way and carrying the trolley wheel W. The said wheel is new in this particularly, that it has three several spokes or arms 2 carrying the hub 3, and provided each with a hole 4 for a purpose which will presently appear.

R represents a contact ring, one for each side of the wheel, and sleeved upon the said hub but adapted to be pressed outward to hold close frictional contact with the sides 5 of the harp or head A. The spring S is of helical form and has two or more coils, the smaller of which is embedded in channels in one side of ring R in the base of the three projections 6. This fixes the spring in the said ring under such strong tension that it is very difficult to remove, and the opposite and otherwise free end of the spring is bent twice at right angles to form what is practically and in effect a hook extremity 7 adapted to extend through and beneath the arm 2 and engage on the opposite side and effectually hold the spring in working position. The shoulder 8 in said end corresponds to the depth or thickness of arm 2, and this causes the real extremity 7 to engage in substantially hook fashion against the opposite side of the arm and prevent accidental displacement. This is important for the reason that without such positive means for confining the spring it is liable to work out especially when ring R becomes worn down to possibly half its original depth or less, as it does often in a comparatively short time and has to be replaced. In such cases the spring is liable to become loose and get detached from the arm in which it is engaged and thus defeat its use and the flow of the electric current through the trolley. Any displacement of a part depended upon for so important a function as this spring is bad for the trolley and for the service and is liable to burn out the internal parts. For this reason I have built the wheel with three arms which are provided with comparatively wide bearing surfaces upon which the spring rests while its end or point 7 is locked beneath the arm on the opposite side from the rest of the spring in its larger coil on the said arms, and the spring at the opposite side of the wheel has an identically similar construction and arrangement.

The projections 6 on ring R are of sufficient length to reach into the space between the said arms and the outwardly projecting lugs or spurs 10 on the hub of the ring and midway between the base of the said arms or spokes at the said hub, thereby confining the ring definitely to the position in which it is placed originally.

The base of each projection 6 has a segmental groove in its inside approximately as deep as the wire S at the middle of said segment and providing a bed in which the wire is practically locked against rotation as well as confined.

Altogether the foregoing makes a materially improved construction of trolley over all that has gone before in so far as I am familiar with the art.

Brass or like metal washers 11 are interposed between the sides of the harp and the rings R, and are of a size to engage upon the spindle B and extend across the ends of the wheel hub and the width of the said rings, and are held against rotation by lips 12 on the edge thereof engaged on the top edge of the harp or by other means as may be preferred. Both the trolley and the rings R bear against these washers, which take the wear off of the harp.

Cotter pins 14 or other means may be used to confine the spindle in the sides of the harp.

It will be observed that the hub 3 has tubular portions at each end outside of the spokes or arms which are of uniform cross section and adapted to slide or sleeve the rings R thereon as shown, and the larger coil of the spring lies outside of said ring against the arms 2, substantially as seen in Fig. 1, and comes into the said ring in its smaller coil so as to occupy the relation substantially as seen in Fig. 2.

Without the hook 7, the spring S would require an excessive tension to hold ring R in constant working relation with the washer W, but this is objectionable as it causes excessive friction and quick wear. On the other hand the use of a hook 7 absolutely prevents the spring from being displaced and permits the use of a spring of less tension than in the other case while still maintaining good contact with a minimum of friction and wear.

What I claim is:

1. A trolley wheel having a central hub and three several substantially flat sided arms supporting said hub having holes through their outer portions, rings mounted on said hubs and helical springs having one end portion mounted in said rings and the other ends engaged through the holes in said arms, said ends bent twice at right angles and having their extremities locked against the opposite sides of said arms.

2. A trolley wheel having a central hub and radially disposed arms supporting the same having relatively wide substantially flat sides and provided with holes through their outer portions and independent lugs on said hub midway between the bases of said arms, said hub having tubular portions at both sides outside of said arms.

3. A trolley wheel having radial arms and a hub in the center provided with independent outward projections midway between said arms and holes through the outer portions of the arms, in combination with a ring mounted on each end of the hub having fingers extending between said arms and said outward projections and a spirally coiled spring having a flat uniform bearing against the inside of each ring and its outer ends extended through one of said holes and locked therein against accidental displacement.

4. A trolley wheel having a hub and radial projections therefrom, a harp in which said wheel is mounted, electric current conducting rings about said hub at each side of the wheel, helical springs about said hub between said rings and the said radial projections, and means to positively secure the said springs to said wheel to prevent lateral displacement and disconnection thereof as the said rings become worn.

In testimony whereof I affix my signature in presence of two witnesses.

HENRY HOLLAND.

Witnesses:
R. B. Moser,
E. M. Fisher.

---

Copies of this patent may be obtained for five cents each, by addressing the "Commissioner of Patents, Washington, D. C."